United States Patent [19]

Kim

[11] 4,329,224
[45] May 11, 1982

[54] WASTEWATER TREATMENT PROCESS
[75] Inventor: Bang M. Kim, Schenectady, N.Y.
[73] Assignee: General Electric Company, Schenectady, N.Y.
[21] Appl. No.: 206,798
[22] Filed: Nov. 14, 1980
[51] Int. Cl.³ .............................................. C02F 1/62
[52] U.S. Cl. .................................. 210/709; 210/716; 210/724; 210/912
[58] Field of Search ............... 210/709, 716, 717, 723, 210/724, 726, 912, 913, 914

[56] References Cited
U.S. PATENT DOCUMENTS
3,740,331 6/1973 Anderson et al. ..................... 210/53
4,102,784 7/1978 Schlauch ............................... 210/47

OTHER PUBLICATIONS
A. K. Robinson and J. C. Sum, "Sulfide Precipitation of Heavy Metals", U.S.E.P.A. EPA-600/2-80-139, Jun. 1980, pp. 7-12.
A. K. Robinson, "Sulfide-VS-Hydroxide Precipitation of Heavy Metals from Ind. Wastewater", U.S.E.P.A., EPA 600/8-78-010, 5/78, pp. 59-65.

Primary Examiner—Thomas G. Wyse
Attorney, Agent, or Firm—Lawrence D. Cutter; James C. Davis, Jr.; Marvin Snyder

[57] ABSTRACT

Heavy metal pollutant ions are precipitated from a wastewater stream as metal sulfides through the addition of a calcium sulfide mixture to the stream. Methods are disclosed for forming the calcium sulfide mixture and for controlling the amount thereof added to the wastewater stream.

12 Claims, 2 Drawing Figures

WASTEWATER TREATMENT PROCESS

BACKGROUND OF THE INVENTION

This invention relates to wastewater treatment processes, and more particularly, to such processes involving the precipitation of metal ions as sulfides.

Much importance has recently been placed on the reduction of effluent levels of priority pollutants from industrial process waste streams due to environmental considerations. These pollutants include heavy metals such as found in wastewater resulting from electroplating operations. A conventional process for removing heavy metals from a wastewater stream is based on the precipitation of metal hydroxides through the addition of a base such as lime or caustic soda to the stream. Resulting metal hydroxide precipitates are then removed by flocculation, clarification and often by filtration. Although effective, this process has limited applicability due to the high solubilities and amphoteric properties associated with metal hydroxides. This process is also not very effective in the presence of chelating agents commonly used in metal finishing operations. Similarly, it is not effective for removing certain metals such as cadmium, silver and lead.

Sulfide precipitation is an alternative wastewater treatment process which advantageously exploits the extremely low solubilities characteristic of metal sulfides. Additionally, metal sulfides are not amphoteric. Accordingly, heavy metals can be removed to extremely low concentrations with the high stability of metal sulfides enabling the precipitation of metals even in the presence of chelating agents. In addition, resulting metal sulfide sludges have better dewatering characteristics than comparable metal hydroxide sludges. Although sulfide precipitation has such advantages, it also has several disadvantages including toxicity, the odor of $H_2S$ evolved in the process, and pollution of treated wastewater with excess sulfide ions. These problems typically arise when sulfide ion addition to a wastewater stream is not carefully controlled. Of course, the addition of sulfide sources in excess of that required also degrades the economics of a wastewater treatment process.

There are two principal sulfide precipitation processes currently available. These processes differ in the technique of delivering metal sulfide ions to an aqueous solution and are termed soluble sulfide and insoluble sulfide processes, respectively. In the soluble sulfide process $Na_2S$ or $NaHS$ solutions are typically added to a wastewater stream. The addition of the solution may be controlled through reference to periodic analysis of wastewater metal content, or alternatively, through the use of a feedback control system employing an ion specific electrode. In either case, the addition of soluble sulfides usually produces colloidal or very fine particles with poor settling characteristics. Accordingly, the particulates are often treated with coagulants and flocculants before final charification of the wastewater stream.

The insoluble sulfide method uses a sparingly soluble metal sulfide as a source of sulfide ions. For example, the process described in U.S. Pat. No. 4,102,784 (Schlauch) uses freshly prepared ferrous sulfide. The addition of the ferrous sulfide is adjusted in response to the concentration of pollutant ions in a wastewater stream as determined by standard jar tests on the wastewater before entering a sulfide precipitation tank. Since ferrous sulfide has a very low solubility the probability of $H_2S$ emission or wastewater contamination by excess sulfide ions is reduced as compared to the soluble sulfide process. However, the low solubility of ferrous sulfide necessitates the addition of 2 to 4 times the stoichiometric amount. Of course, the use of excess ferrous sulfide adds to the chemicals cost of the process. More importantly, large amounts of waste sludge result from the addition of excess ferrous sulfide. For example, the Sulfex ® process which employs ferrous sulfide can produce as much as three times the sludge produced in conventional hydroxide precipitation processes.

Indeed, one of the major problems historically encountered in chemical precipitation cleanup processes has been the disposal of resulting waste sludges. The Resource Conservation and Recovery Act of 1976 (Public Law 94-580) has imposed regulations covering the disposal of toxic industrial sludges. Due to these regulations, the disposal of sludges containing toxic wastes incur significant cost penalties. Accordingly, whereas it is desirable to reduce the total amount of waste sludge produced in a wastewater treatment process, it is especially desirable to specifically reduce the amount of toxic sludge produced therein.

Thus, it is an object of the present invention to provide an improved wastewater treatment process which enables a substantially complete removal of pollutant metal ions, even in the presence of chelating agents.

It is also an object of the present invention to reduce the total amount of the sludge produced in a wastewater treatment process, and more specifically, to reduce the amount of toxic sludge so produced.

It is a further object of the present invention to enable a simplified continuous control of sulfide addition in a wastewater treatment process.

Still another object of the present invention to provide a simple and economical method for providing a calcium sulfide mixture for use in a sulfide precipitation wastewater treatment process.

SUMMARY OF THE INVENTION

The above and other objects and benefits are obtained through the practice of the present invention in which heavy metal pollutant ions are precipitated from an aqueous solution by first forming an aqueous calcium sulfide mixture comprising $Ca(OH)_2$ and $Ca(HS)_2$ in solution, and by adding enough of the calcium sulfide mixture to the aqueous solution so as to effect the precipitation of heavy metal ions therefrom. In a preferred embodiment of the invention, the calcium sulfide mixture is formed by contacting a substantially stoichiometric quantity of hydrogen sulfide with a lime slurry. The addition of calcium sulfide mixture is preferably controlled in response to a single sensed parameter such as the pH level in a wastewater stream upon addition of calcium sulfide mixture thereto. In a preferred wastewater treatment process according to the present invention, toxic and non-toxic pollutant materials are separately removed from a wastewater stream. In this embodiment, non-toxic metal ions and other materials are first removed from the wastewater through a hydroxide precipitation technique performed at a pH of between approximately 4 and 6, with the toxic ions being subsequently removed by sulfide precipitation through the addition of a calcium sulfide mixture thereto.

BRIEF DESCRIPTION OF THE DRAWING

The subject invention may be better understood through reference to the accompanying drawing in which.

DESCRIPTION OF THE INVENTION

Figure 1:
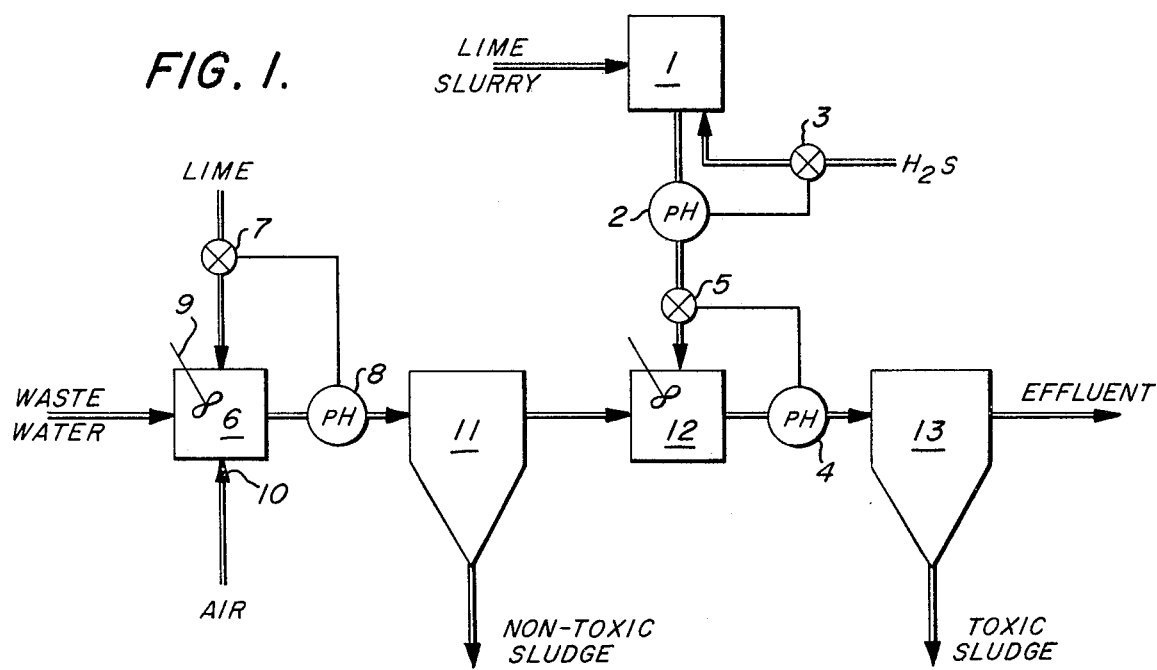
FIG. 1 is a schematic representation of a preferred two-stage wastewater treatment process according to the present invention.

From the foregoing, it is apparent that currently available sulfide precipitation processes have several disadvantages. These disadvantages are substantially avoided through the practice of the present invention in which an aqueous calcium sulfide mixture is employed as a sulfide source. Calcium sulfide, which is only stable in a dry solid form, reacts with water to produce $Ca(OH)_2$ and $Ca(HS)_2$. Accordingly, as used herein the term aqueous CaS mixture comprises $Ca(OH)_2$ and $Ca(HS)_2$ in solution. In practice the $Ca(OH)_2$ is typically present as a solid while the soluble $Ca(HS)_2$ forms $Ca^{++}$, $HS^-$ and $S^{--}$ ions.

The addition of CaS mixture to a wastewater stream produces easily settlable precipitates. Solid $Ca(OH)_2$ particles act as nuclei for the production of metal sulfide particles formed through a combination of metal and $HS^-$ or $S^{--}$ ions. Dissolved bivalent calcium ions function as coagulants assisting the formation and resulting precipitation of large metal sulfide particles. This of course contrasts with the poor settling characteristics typical of soluble sulfide precipitation techniques employing monovalent sodium. Polyelectrolytes may be added as known in the art for flocculation to further improve the settling of the precipitates. Since the sulfide-bearing constituent of the CaS mixture is soluble, the CaS required to provide a sufficient sulfide source is near stoichiometric in contrast to the insoluble ferrous sulfide precipitation process described above. Additionally, since much of the calcium is dissolved in the wastewater after reaction, the sludge volume resulting from the use of calcium sulfide solution according to the present invention is correspondingly small.

Solid calcium sulfide may be added directly to wastewater as a slurry. However, solid calcium sulfide is relatively expensive and is presently available in only limited amounts. Accordingly, in a preferred embodiment of the present invention depicted in FIG. 1 a calcium sulfide mixture is separately prepared in a suitable vessel 1 by passing hydrogen sulfide gas through a lime slurry. Since $H_2S$ is an economically available by-product of industrial pollution control processes, the use thereof as a source of sulfide species decreases the chemicals cost for the subject precipitation method. Moreover, this embodiment provides for an indirect addition of $H_2S$ to a wastewater stream in the form of $Ca(HS)_2$, thereby minimizing mass transfer problems between gaseous $H_2S$ and a liquid waste stream.

If excess hydrogen sulfide is passed through a lime slurry during formation of a CaS mixture, the $Ca(OH)_2$ will be converted to $Ca(HS)_2$. The resulting high $HS^-$ concentration can result both in toxic fumes and in a non-stoichiometric CaS mixture which complicates subsequent CaS addition control as described hereinbelow. Accordingly, the addition of $H_2S$ for contacting with a lime slurry is controlled in a preferred embodiment of the present invention to achieve a stoichiometric 1:1 ratio of calcium and sulfur.

Since concentrations of $Ca(OH)_2$ and $Ca(HS)_2$ balance in a stoichiometric mixture to give a specific mixture pH of approximately 12 $H_2S$ addition control is advantageously effected in response to the sensed pH of a resulting CaS mixture. Thus, as depicted in FIG. 1, a conventional pH-sensitive device 2 controls $H_2S$ feedrate in response to sensed CaS mixture pH level through regulation of a valve 3 in an $H_2S$ supply line. Accordingly, if the sensed pH is higher than a predetermined value (e.g. greater than 12) the $H_2S$ delivery rate is increased. Correspondingly, when the sensed pH is below a predetermined value (e.g. less than 12) the rate of $H_2S$ delivery is decreased. This method of $H_2S$ addition control results in a minimum amount of $H_2S$ being emitted from the process since the lime slurry and $H_2S$ reaction is fast, resulting in a very low $H_2S$ partial pressure in a CaS mixture and enabling a very prompt pH-responsive $H_2S$ addition control system. In another embodiment the CaS mixture is obtained by mixing $Ca(OH)_2$ (hydrated lime) and NaHS. In this embodiment, the stoichiometric amount of calcium and sulfur should be mixed to have the same properties as CaS.

As a sulfide precipitation reaction with a given wastewater stream goes to completion according to the present invention, the sulfide concentration and pH level abruptly increase, as evidenced hereinbelow in Example 4, indicating a need to decrease the rate of supply of calcium sulfide mixture. Thus, the addition of the formed CaS mixture to a wastewater stream can be controlled in response to sensed sulfide concentration in the stream through the use of a standard sulfide ion selective electrode. However, in a preferred embodiment, pH measurement alone is employed to control CaS solution addition as illustrated in FIG. 1. In this embodiment a conventional pH sensing device 4 controls the functioning of a valve 5 in a CaS mixture feed line. Upon sensing a predetermined setpoint pH value in a solution to which the mixture has been added, the pH device 4 causes the valve 5 to close, thereby decreasing the mixture delivery rate. The determination of a setpoint pH value indicative of the completion of a reaction for a specific wastewater stream can be determined as described in Example 4. As described therein, a setpoint pH of between 7 and 10 is preferred, with a setpoint pH of 9 preferred for the wastewater stream described in Example 4.

In a preferred embodiment of the present invention as depicted in FIG. 1, heavy metals are removed from a wastewater stream in a two-stage process in which non-toxic metals and suspended solids are removed by hydroxide precipitation in the first stage, while residual toxic heavy metals are precipitated as sulfides in the second stage. This two-stage process advantageously enables the separate production of toxic and non-toxic sludges, thereby facilitating sludge disposal. This process is especially attractive when toxic heavy metals are mixed with non-toxic metals such as iron and other non-toxic suspended solids.

More specifically, a wastewater stream is adjusted to and maintained at a pH of between 4 and 6, and preferably approximately 5 in the first stage of the process such that precipitates formed in this stage will be stable at pH 5 or greater, and can thus be disposed of in non-toxic landfill areas. The pH is adjusted in a mixing vessel 6 through the controlled addition of lime through a valve 7 actuated in response to the pH level of mixing vessel effluent as sensed by a conventional pH sensitive device 8. A stirrer 9 is included in the vessel 6 to mix the lime into the wastewater stream. Oxygen containing gas may be supplied as at 10 to convert any ferrous ions in the wastewater to ferric ions to enable the hydroxide precipitation thereof. The pH adjusted stream is then passed to a standard settling tank 11 for clarification through gravity separation. The metal hydroxide precipitates are removed from the tank 11 and are disposed of as a non-toxic sludge.

A resultant aqueous solution depleted in non-toxic heavy metal ions is removed from the settling tank 11 and is transferred to a mixing vessel 12 of the process second stage in which residual toxic metal ions are precipitated as metal sulfides. As described above, CaS mixture is added to the resultant solution in the vessel 12 in response to pH level of vessel 12 effluent as detected by pH sensor 4. The effluent is then passed to a settling tank 13 where toxic metal sulfides are precipitated from the solution to form a heavy metal ion-depleted effluent and a toxic sludge. The sludge will require a secure landfill as defined by EPA regulations. However, since this two-stage process separates toxic and non-toxic sludges, the amount of sludge requiring a secure landfill is significantly reduced. Additionally, since the second stage sludge is concentrated in heavy metals, recovery of heavy metals is a possible alternative method to landfill disposal.

Single stage co-precipitation of sulfides and hydroxides in a single reaction vessel is an alternative embodiment of the present invention. In this embodiment, a CaS mixture added to a wastewater stream is formed to contain an amount of $Ca(OH)_2$ in excess of the stoichiometric amount to permit satisfactory hydroxide precipitation. Thus, the pH setpoint of the controller 2 is preferably set at greater than 12 such that the $H_2S$ delivery rate through the valve 3 is decreased prior to obtaining a pH corresponding to a stoichiometric CaS mixture (approximately 12). An exact preferred ratio of $Ca(OH)_2$ and $Ca(HS)_2$ is determinable from the ratio of metal hydroxides and metal sulfides to be precipitated. Since some metal hydroxides are present in the precipitate, pollution of the wastewater due to the presence of excess sulfide ions will not occur since sulfide precipitation is a preferred reaction. This co-precipitation process requires less sulfide sources than a comparable sulfide precipitation process while still effectively removing metals with low solubility sulfides.

The advantages of the present invention are apparent from the following examples:

EXAMPLE IA

Batch sulfide precipitation treatment of simulated wastewater containing metal pollutants as indicated in Table 1 involved the addition of lime until a pH of 7 was obtained. Next 0.1 M CaS mixture was added until a pH of 9.0 was reached. Resulting precipitates were flocculated with 2 ppm Nalco 7763 polyelectrolyte. Vigorous mixing (~600 rpm) of the solution for 2 min. followed by moderate mixing (~30 rpm) for 1 min. was sufficient for effective flocculation. The flocs were settled for 30 min. before sampling supernatant liquid for analysis. The solution was further filtered with 0.2μ Acropor ® filter to remove any suspended solids. The results of this CaS precipitation experiment are listed in Table 1 and are compared therein to effluents obtained in a similar experiment involving hydroxide precipitation in which lime was added in lieu of CaS solution. As noted in Table 1, hydroxide precipitation was relatively ineffective for removal of cadmium and silver. The capability of hydroxide precipitation to achieve concentrations lower than their theoretical solubilities is presumed due to co-precipitation with other hydroxides. Cadmium and silver were more effectively removed by sulfide precipitation employing CaS mixture.

TABLE 1

| Elements | Feed(ppm) | EFFLUENT(ppm) | | | |
|---|---|---|---|---|---|
| | | Sulfide | | Hydroxide | |
| | | UF | F | UF | F |
| Cd | 100 | 0.18 | 0.16 | 11.5 | 10.0 |
| Cd | 10 | <0.05 | <0.05 | 0.27 | 0.24 |
| Cr | 10 | 0.01 | <0.01 | <0.01 | <0.01 |
| Cu | 10 | <0.01 | <0.01 | <0.01 | <0.01 |
| Ni | 10 | 0.056 | 0.02 | 0.02 | <0.01 |
| Zn | 10 | <0.03 | <0.03 | <0.03 | <0.03 |
| Ag | 4.0 | 0.05 | 0.05 | 2.64 | 1.60 |
| Cu | 8.9 | <0.01 | <0.01 | 0.03 | 0.01 |
| Zn | 8.7 | 0.09 | <0.01 | 0.13 | 0.05 |

UF: Unfiltered
F: Filtered

EXAMPLE IB

A simulated wastewater stream was treated as in Example IA, except that chelating agents ($Na_2EDTA$) were included in the wastewater to study the effects thereof. The metal concentrations of similar influent streams and of separate effluent streams after sulfide and hydroxide precipitation processes respectively are presented in Table 2. Sulfide precipitation was notably effective for removal of Cd and Cu, resulting in a reduction of total metal content. In the case of Ni, it is known that NiS is oxidized to $Ni(OH)_2$ in the presence of air. Free chelating agents released by precipitation of CdS and CuS possibly result in the formation of a Ni chelate with $Ni(OH)_2$. A high concentration of Zn after sulfide precipitation may be explained by redissolution of ZnS in an excess amount of sulfide ion.

TABLE 2

| Elements | Feed(ppm) | EFFLUENT(ppm) | | | |
|---|---|---|---|---|---|
| | | Sulfide | | Hydroxide | |
| | | UF | F | UF | F |
| Zn | 10 | 0.72 | 0.49 | 0.28 | 0.25 |
| Ni | 10 | 7.53 | 7.30 | 7.30 | 6.90 |
| Cr | 10 | 0.14 | 0.12 | 0.16 | 0.11 |
| Cu | 10 | 0.51 | 0.15 | 3.62 | 3.75 |
| Cd | 10 | 0.31 | 0.02 | 5.1 | 5.1 |
| $Na_2EDTA$ | 100 | — | — | — | — |
| Total Metal | 50 | 0.98 | 8.31 | 16.06 | 16.51 |

UF: Unfiltered
F: Filtered

EXAMPLE II

A continuous wastewater treatment system was tested for removing pollutant ions from a wastewater stream typical of a plant involved in metal finishing and ore processing. Cadmium removal and sludge volume reduction were of particular interest. Calcium sulfide mixture was prepared as described hereinabove by contacting a lime slurry with $H_2S$. A stoichiometric ratio of Ca and S was obtained as described above by controlling $H_2S$ additions in response to sensed pH of the resulting CaS mixture. Vessels for pH adjustment, sulfide precipitation and flocculation were included in the system. The system could treat wastewater up to 120 ml/min. As in Example 1, pH was adjusted to 7, with CaS solution then added until the pH increased to 9. As indicated in Table 3, the sulfide precipitation process resulted in a significant Cd level reduction over that achieved with a comparable hydroxide precipitation technique. The settling rates for hydroxide and sulfide flocs were also compared by observing the floc boundary in a graduated cylinder. The settling rate of sulfide flocs was 50% faster than comparable hydroxide flocs. The volume of the flocs generated from 500 ml wastewater was 32 ml by hydroxide precipitation and 22 ml by sulfide precipitation. The smaller floc volume of the sulfide precipitates suggests less water content and better dewatering characteristics of the sulfide sludge than the hydroxide sludge.

TABLE 3

| Elements | Feed(ppm) | EFFLUENT(ppm) | | | |
|---|---|---|---|---|---|
| | | Sulfide | | Hydroxide | |
| | | UF | F | UF | F |
| Al | 16.0 | <0.5 | <0.5 | <0.5 | <0.5 |
| Cd | 7.95 | <0.05 | <0.05 | 0.52 | 0.6 |
| Cr | 1.34 | <0.05 | <0.05 | <0.05 | <0.05 |
| Cu | 18.6 | <0.05 | <0.05 | 0.11 | 0.08 |
| Pb | 3.5 | <0.5 | <0.5 | <0.5 | <0.5 |
| Zn | 47.0 | <0.05 | <0.05 | <0.05 | <0.05 |

UF: Unfiltered
F: Filtered

EXAMPLE III

Wastewater from a plant involved in electroplating, pickling, bonderite and aluminum etching includes a large amount of suspended solids (300 ppm) and iron (30 ppm) together with a small amount of heavy metals (10 ppm). A two-stage precipitation process was employed including a first stage hydroxide precipitation at pH 5 in which suspended solids and iron were removed. A leachate test based on an EPA Extraction Procedure as set forth in the Federal Register of May 19, 1980 (Vol. 45, No. 98) was performed on the first stage sludge and indicated extract levels of Ni, Zn and Cr of less than 1 ppm. A second stage precipitation was conducted as in Example II with CaS mixture added until a pH of 9 was achieved. A similar second stage hydroxide precipitation was also conducted, with results from both tests indicated in Table 4. In processing this type of wastewater the subject plant typically produces 30 tons of toxic sludge per day using a convenient single stage hydroxide precipitation process. This test indicates that a two-stage process will produce non-toxic sludges at 28.5 Ton/day and toxic sludges at 1.5 Ton/day, thereby enabling a significant disposal cost reduction. Of course, the characteristic benefits of the subject CaS precipitation process described above inhere to a second stage process employing a CaS mixture.

TABLE 4

| Elements | Feed(ppm) | EFFLUENT(ppm) | | | |
|---|---|---|---|---|---|
| | | Sulfide | | Hydroxide | |
| | | UF | F | UF | F |
| Cu | 0.028 | <0.01 | <0.01 | <0.01 | <0.01 |
| Fe | 2.42 | 0.03 | <0.01 | 0.05 | <0.01 |
| Ni | 2.40 | 0.53 | 0.38 | 0.90 | 0.5 |
| Pb | 0.08 | 0.03 | 0.03 | 0.05 | 0.05 |
| Zn | 3.15 | 0.13 | 0.03 | 0.52 | 0.02 |
| Cu | 0.03 | <0.01 | <0.01 | <0.01 | <0.01 |
| Fe | 3.55 | <0.01 | <0.01 | <0.01 | <0.01 |
| Ni | 2.25 | 0.52 | 0.54 | 0.80 | 0.62 |
| Pb | 0.03 | <0.03 | <0.03 | <0.03 | <0.03 |

TABLE 4-continued

| Elements | Feed(ppm) | EFFLUENT(ppm) | | | |
|---|---|---|---|---|---|
| | | Sulfide | | Hydroxide | |
| | | UF | F | UF | F |
| Zn | 1.90 | <0.02 | <0.02 | <0.02 | <0.02 |

UF: Unfiltered
F: Filtered

EXAMPLE IV

Tests were conducted which illustrate the feasibility of controlling CaS mixture addition to a wastewater stream in response to a single sensed variable, i.e. sulfide ion concentration, and more preferably, pH level of the stream being treated. Additionally, similar tests can be employed to determine a setpoint for a pH or sulfide ion concentration-sensing controller for CaS mixture addition to a wastewater stream of a given makeup. In this regard it is noted that waste streams having different makeups will exhibit different sulfide precipitation reaction rates, resulting in different optimum predetermined pH or sulfide concentration setpoints. Thus, a pH setpoint for controlling CaS mixture addition will preferably be between 7 and 10, with the preferred pH setpoint for the specific waste stream of this example being 9. Similarly, the preferred sulfide concentration setpoint in the present example would be between approximately 0 and −400 mV, and more preferably approximately −300 mV.

A solution containing 100 ml of 100 ppm $Cu^{++}$ was treated with 0.1 M CaS mixture and the responses of pH and sulfide electrodes were measured. The sulfide electrode used was an Orion Model 94-16. The results are presented in FIG. 2. The CaS solution was made by passing $H_2S$ through $Ca(OH)_2$ slurry as described hereinabove.

Figure 2:
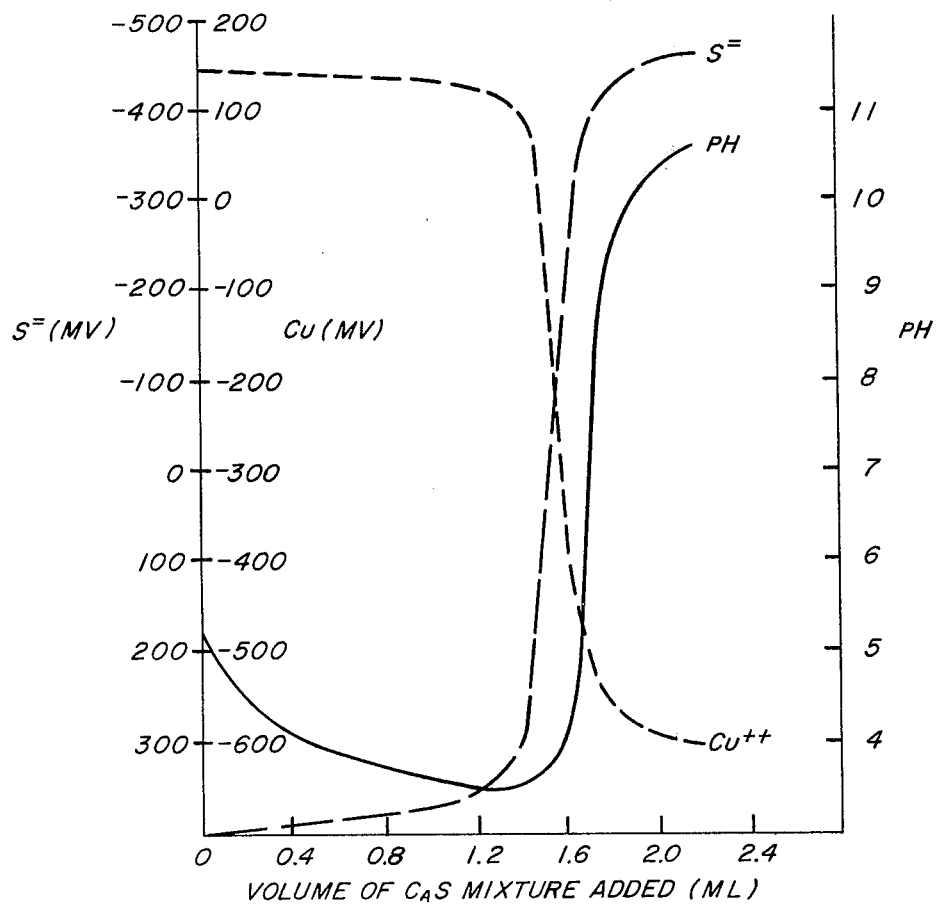
FIG. 2 is a graphical representation of results obtained in tests described as Example IV hereinbelow.

As can be appreciated from FIG. 2, a steep increase in pH and sulfide electrode responses and a sharp decrease in $Cu^{++}$ concentration was observed as the sulfide precipitation reaction reached completion. This indicates that control of sulfide additions is possible by using the sulfide electrode since the change of the sulfide electrode response near the completion of the reaction was so large (>500 mV) that characteristic baseline change due to instability of the electrode was not considered a significant problem. Indeed, in certain applications the use of a sulfide electrode is preferable, as when arsenates are to be removed from a wastewater stream. More specifically, in the case of arsenate removal by sulfide precipitation, the pH level increases significantly before the reaction goes to completion as shown by the following:

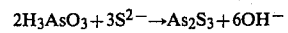

$$2H_3AsO_3 + 3S^{2-} \rightarrow As_2S_3 + 6OH^-$$

Thus, although sulfide addition control in response to sensed pH may be employed with arsenates, a better indication of reaction completion may be obtained by employing a sulfide electrode. However, the control of CaS mixture addition by using a characteristically more stable pH electrode is considered preferably to using a sulfide electrode in most situations.

In the aforementioned experiments, the use of a calcium sulfide mixture produced large metal sulfide particles, which could be easily removed by flocculation. In contrast, similar experiments employing sodium sulfide produced colloidal suspensions, which required treatment with coagulants such as alum before flocculation.

The above-described embodiments of this invention are intended to be exemplitive only and not limiting and it will be appreciated from the foregoing by those skilled in the art that many substitutions, alterations and changes may be made to the disclosed processes without departure from the spirit or the scope of the invention.

What is claimed as new and desired to be secured by Letters Patent of the United States is:

1. A process for precipitating heavy metal pollutant ions from an aqueous solution to be treated, comprising the steps of:
    (a) forming an aqueous CaS mixture comprising Ca(OH)$_2$ and Ca(HS)$_2$ in solution; and
    (b) adding enough of the CaS mixture to said aqueous solution to be treated to precipitate heavy metal pollutant ions therefrom.

2. A process as in claim 1 wherein the addition of CaS mixture in step (b) is controlled by sensing the pH level of the aqueous solution upon addition of the CaS mixture thereto, and decreasing the rate of CaS mixture addition when the sensed pH level exceeds a predetermined value.

3. A process as in claim 2 wherein said predetermined value is between 7 and 10.

4. A process as in claim 1 wherein the addition of CaS mixture in step (b) is controlled by sensing sulfide ion concentration in the aqueous solution upon addition of CaS mixture thereto, and decreasing the rate of CaS mixture addition when the sensed sulfide concentration exceeds a predetermined value.

5. A process as in claim 1 wherein the CaS mixture is formed in step (a) by contacting a lime slurry with a quantity of H$_2$S.

6. A process as in claim 5 wherein the quantity of H$_2$S contacted with the lime slurry is controlled by sensing the pH level CaS mixture formed in step (a) and by decreasing the quantity of H$_2$S provided for contacting when the sensed pH level is below a predetermined value.

7. A process as in claim 6 wherein said predetermined value is approximately 12.

8. A process as in claim 5 wherein the lime slurry is contacted with a substantially stoichiometric quantity of H$_2$S.

9. A process as in claim 1 wherein the CaS mixture is formed by mixing hydrated lime with NaHS.

10. A two-stage process for precipitating heavy metal pollutant ions from an aqueous solution comprising the steps of:
    (a) adjusting the pH of the aqueous solution to between approximately 4 and 6 through the addition of a base whereby a first quantity of heavy metal pollutant ions are precipitated from the solution to form a resultant aqueous solution:
    (b) removing the resultant aqueous solution;
    (c) forming an aqueous CaS mixture comprising Ca(OH)$_2$ and Ca(HS)$_2$ in solution; and
    (d) adding enough of the CaS mixture to the resultant aqueous solution to precipitate a second quantity of metal pollutant ions therefrom.

11. A process as in claim 10 which the aqueous solution is aerated during the addition of the base in step (a).

12. A sulfide and hydroxide co-precipitation process for removing heavy metal pollutant ions from an aqueous solution comprising the steps of:
    (a) forming an aqueous CaS mixture having a pH of greater than 12 comprising Ca(OH)$_2$ and Ca(HS)$_2$ in solution; and
    (b) adding enough of the CaS mixture to said aqueous solution to precipitate heavy metal pollutant ions therefrom as metal sulfide and metal hydroxide compounds.

* * * * *